United States Patent
Reddy et al.

(10) Patent No.: US 10,305,934 B2
(45) Date of Patent: May 28, 2019

(54) IDENTITY BASED DOMAIN NAME SYSTEM (DNS) CACHING WITH SECURITY AS A SERVICE (SECAAS)

(71) Applicant: Cisco Technology, Inc., San Jose, CA (US)

(72) Inventors: K. Tirumaleswar Reddy, Karnataka (IN); Prashanth Patil, San Jose, CA (US); Daniel G. Wing, Truckee, CA (US)

(73) Assignee: Cisco Technology, Inc., San Jose, CA (US)

( * ) Notice: Subject to any disclaimer, the term of this patent is extended or adjusted under 35 U.S.C. 154(b) by 354 days.

(21) Appl. No.: 15/165,032

(22) Filed: May 26, 2016

(65) Prior Publication Data

US 2017/0346855 A1 Nov. 30, 2017

(51) Int. Cl.
*H04L 29/06* (2006.01)
*H04L 29/08* (2006.01)
*H04L 29/12* (2006.01)

(52) U.S. Cl.
CPC .......... *H04L 63/20* (2013.01); *H04L 61/1511* (2013.01); *H04L 61/6009* (2013.01); *H04L 63/104* (2013.01); *H04L 67/2842* (2013.01)

(58) Field of Classification Search
CPC . H04L 63/20; H04L 61/1511; H04L 61/6009; H04L 63/104; H04L 67/2842
See application file for complete search history.

(56) References Cited

U.S. PATENT DOCUMENTS

| | | | |
|---|---|---|---|
| 7,792,994 B1* | 9/2010 | Hernacki | H04L 12/66 709/229 |
| 8,447,856 B2* | 5/2013 | Drako | H04L 29/12066 709/203 |
| 9,215,123 B1* | 12/2015 | Fears | H04L 67/22 |
| 9,413,714 B2* | 8/2016 | Treuhaft | H04L 61/1511 |
| 10,015,239 B1* | 7/2018 | Flowers | H04L 67/10 |
| 2002/0138649 A1* | 9/2002 | Cartmell | H04L 29/06 709/245 |
| 2003/0074461 A1* | 4/2003 | Kang | H04L 29/12066 709/230 |
| 2006/0010224 A1* | 1/2006 | Sekar | G06Q 20/382 709/217 |

(Continued)

*Primary Examiner* — Sharon S Lynch
(74) *Attorney, Agent, or Firm* — Edell, Shapiro & Finnan, LLC (57) ABSTRACT

A local network element on an enterprise network caches Domain Name System (DNS) responses in association with user identifiers in accordance with a DNS-based access control policy. The network element receives a DNS request from a first endpoint device. The DNS request includes a domain name to resolve. The network element forwards the DNS request to a domain name server along with a first user identifier associated with the first endpoint device. The network element receives a DNS response from the domain name server. The DNS response includes a network address associated with the domain name, as well as the first user identifier and at least one other user identifier. The network element stores the network address in a DNS cache as a cached DNS response for the domain name. The cached DNS response is stored in association with the first user identifier and the other user identifier(s).

17 Claims, 6 Drawing Sheets

(56) References Cited

U.S. PATENT DOCUMENTS

| | | | |
|---|---|---|---|
| 2009/0119402 A1* | 5/2009 | Shull | H04L 29/12066 709/224 |
| 2009/0216875 A1* | 8/2009 | Shi | H04L 63/0236 709/224 |
| 2010/0054222 A1* | 3/2010 | Rune | H04L 29/12066 370/338 |
| 2010/0131646 A1* | 5/2010 | Drako | H04L 29/12066 709/225 |
| 2012/0185613 A1* | 7/2012 | Noldus | H04L 29/12066 709/248 |
| 2013/0007194 A1* | 1/2013 | Doleh | H04L 67/2814 709/217 |
| 2013/0036307 A1* | 2/2013 | Gagliano | H04L 9/321 713/171 |
| 2013/0204920 A1* | 8/2013 | Doleh | H04L 67/2814 709/201 |
| 2013/0250838 A1* | 9/2013 | Liang | H04W 4/08 370/312 |
| 2015/0074169 A1* | 3/2015 | Doleh | H04L 67/2814 709/201 |
| 2015/0127802 A1* | 5/2015 | Treuhaft | H04L 61/1511 709/223 |
| 2015/0142987 A1* | 5/2015 | Noldus | H04L 29/12066 709/228 |
| 2015/0163245 A1 | 6/2015 | Kondamuru et al. | |
| 2015/0188949 A1 | 7/2015 | Mahaffey et al. | |
| 2015/0256508 A1* | 9/2015 | Townsend | H04L 61/20 709/245 |
| 2015/0312331 A1* | 10/2015 | Crocker | H04L 63/061 709/205 |
| 2016/0014082 A1 | 1/2016 | Bharali et al. | |
| 2016/0028847 A1 | 1/2016 | Bradshaw et al. | |
| 2016/0036848 A1 | 2/2016 | Reddy et al. | |
| 2016/0112523 A1* | 4/2016 | Bagasra | G06F 17/30861 709/217 |
| 2016/0173440 A1* | 6/2016 | Stahura | H04L 61/1511 709/245 |
| 2016/0308821 A1* | 10/2016 | Siba | H04L 61/2007 |
| 2017/0118266 A9* | 4/2017 | Doleh | H04L 67/2814 |
| 2017/0264590 A1* | 9/2017 | Xing | H04L 63/0254 |
| 2017/0310484 A1* | 10/2017 | Kaliski, Jr. | H04L 9/3247 |

* cited by examiner

IDENTITY BASED DOMAIN NAME SYSTEM (DNS) CACHING WITH SECURITY AS A SERVICE (SECAAS)

TECHNICAL FIELD

The present disclosure relates to domain name systems in computer networks.

BACKGROUND

A Domain Name System (DNS) provides a service to allow endpoint computers to resolve domain names, such as "cisco.com," into a network address reachable by the endpoint. A DNS typically requires an authoritative domain name server to maintain a mapping of domain names to network addresses, which provides a point to control access to the network access of public web servers.

When using a DNS-based security service, different policies may need to be applied to different user communities. One group of users, such as public relations staff, may require access to different web resources, such as social media, that a company may block from another group of users. One solution relies on each DNS query to identify the user group associated with the query. A domain name server associated with a Security-as-a-Service (SecaaS) can use the identified user group to determine whether to provide the appropriate network address or to block the DNS query. Different users may receive different DNS responses, based on policies of the DNS-based SecaaS.

DESCRIPTION OF EXAMPLE EMBODIMENTS

Overview

Methods are presented herein for caching DNS responses in association with user identifiers in accordance with a DNS-based access control policy. In one embodiment, a method comprises, at a first network element, receiving a first DNS request from a first endpoint device. The first DNS request includes a domain name to resolve. The network element forwards the first DNS request to a domain name server along with a first user identifier associated with the first endpoint device. The network element receives a first DNS response from the domain name server. The first DNS response includes a network address associated with the domain name, as well as the first user identifier and at least one second user identifier. The network element stores the network address in a DNS cache as a cached DNS response for the domain name. The cached DNS response is stored in association with the first user identifier and the second user identifier.

DETAILED DESCRIPTION

The techniques presented herein provide for a local DNS cache while preserving the ability to provide a DNS-based security services at an authoritative, remote DNS server. This solution allows the local caching to preserve the user experience without excess DNS-based round trip delays. The DNS cache maintains different DNS responses to DNS queries based on the policies associated with each user group. The DNS responses from the remote DNS server include signaling of which user groups are allowed to receive a particular DNS response, allowing the local network elements of an enterprise network to cache DNS responses locally and deliver the appropriate DNS response to the appropriate user groups according to remotely determined access policies.

When DNS responses are based on user identity, it becomes challenging for a DNS cache to serve the same responses for DNS requests made by other users. In other words, a cached response stored in the local DNS cache for one user may not be appropriate to send in response to a DNS request from another user. This results in all DNS requests being sent to the remote domain name server, which prevents DNS caching and harms user experience. The techniques presented herein enable the domain name server to include applicable user groups with the DNS responses so that the DNS cache can serve the cached response to all users belonging to those applicable user groups.

Figure 1:
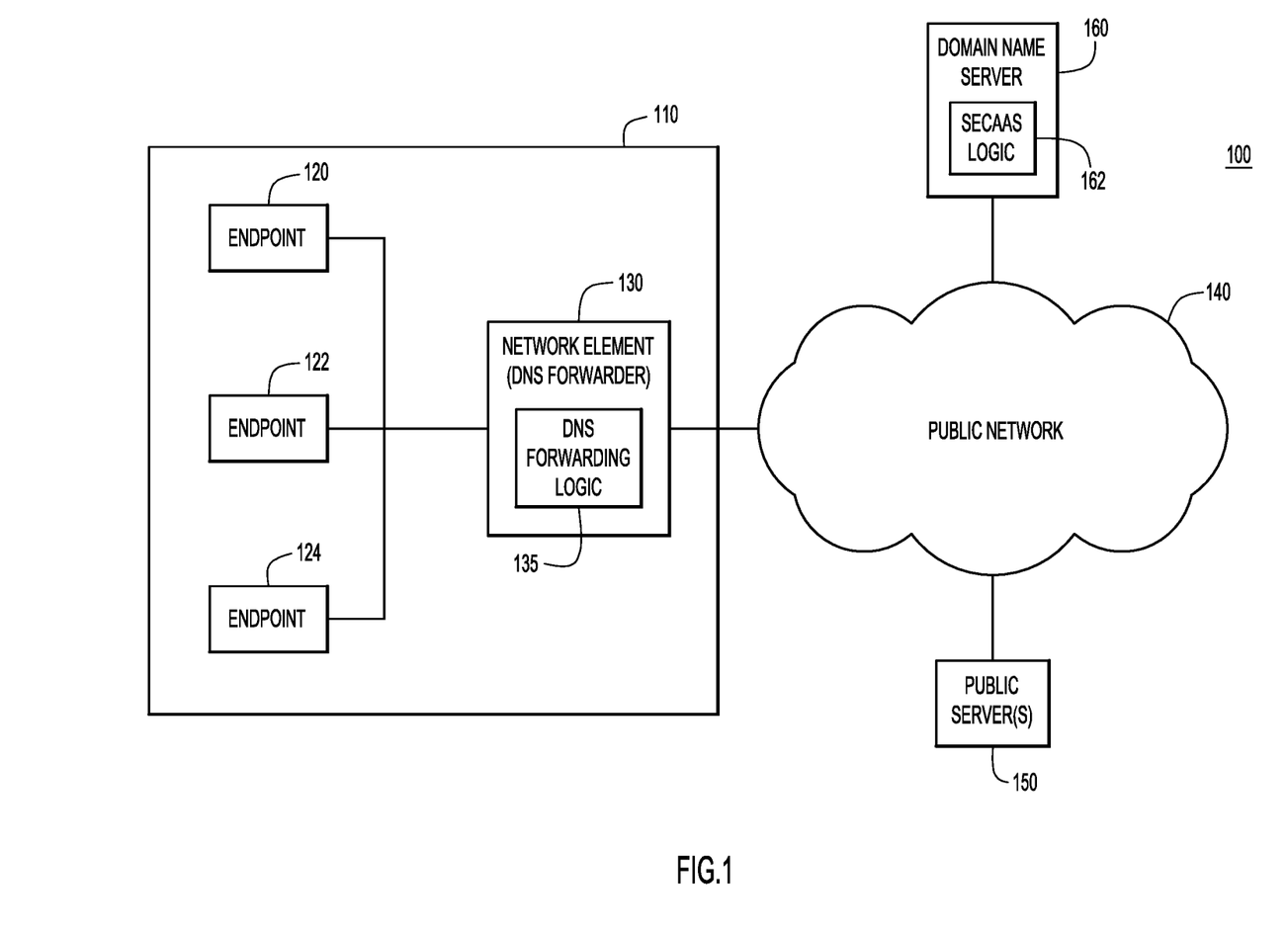
FIG. 1 is a system block diagram illustrating a Domain Name System (DNS) that caches DNS entries in association with user groups, according to an example embodiment.

Referring now to FIG. 1, a system block diagram is shown for a system 100 that provides DNS-based security services with locally cached DNS responses. The system 100 includes an enterprise network 110, e.g., a corporate intranet to connect employees of an organization to each other and to the public Internet. The enterprise network 110 includes endpoints 120, 122, and 124 and a network element 130. In one example, the endpoints 120, 122, and 124 are each used by different users within the organization, and may be subject to varying degrees of internal and/or external network access. The network element 130 is configured to perform as a DNS forwarder including DNS forwarding logic 135. The DNS forwarding logic 135 is used to provide DNS responses to any DNS requests from endpoints 120, 122, and/or 124.

In another example, the endpoint devices 120, 122, and 124 may include various types of computing devices (e.g., desktop computers, laptop computers, smart phones, tablet computers, servers, network telephones, etc.) or virtual endpoints (e.g., virtual machines). The network element 130 may comprise a router, switch, gateway, or any other device that processes network traffic from a plurality of other computing devices or other network elements. The enterprise network 110 connecting the endpoints 120, 122, and 124 to the network element 130 may comprise one or more computer networks of any type (e.g., wired, wireless, local area network, wide area network, virtual local area network, etc.).

Through the network element 130, the enterprise network 110 is connected to a public network 140 (e.g., a public Internet), which also connects to one or more public servers 150 (e.g., public web servers) and a domain name server 160. The public server(s) 150 provide content that may be appropriate for endpoints of some users, while not appropriate for endpoints of other users. The domain name server 160 may be a recursive DNS server that queries authoritative DNS servers (not shown). The domain name server 160 includes SecaaS logic 162 that provides for policy-based access to the public web server(s) 150 for appropriate user groups in the enterprise network 110.

In one example, each of the public server(s) 150 is associated with a domain name that is typically easier for users to remember than the network address used by the networking protocols in the public network 140. The domain name server 160 acts as a recursive domain name server and maintains a mapping of domain names of the public server(s) 150 and the network addresses used to reach the public server(s) 150 over the public network 140. The SecaaS logic 162 in the domain name server 160 applies access policies to return DNS responses to DNS requests from devices in the enterprise network 110.

In another example, the network element 130 caches DNS responses from the domain name server 160, and provides the cached DNS responses to appropriate user groups in order to avoid the round trip network delay to the domain name server 160. The DNS responses from the domain name server 160 include an indication of the user groups that are authorized to access each DNS response. In this way, the cached DNS responses are associated with one or more user groups. Any DNS request for a domain name associated with a cached DNS response needs to also be matched with an authorized user group in order for the cached DNS response to be valid. Otherwise, the DNS request is forwarded to the domain name server 160, which will determine the appropriate DNS response, such as the network address associated with the domain name server 160. The domain name server 160 can then act as a SecaaS provider and provide error messages to any endpoint that is not authorized to access particular domain names. The network element 130 may inform the SecaaS logic 162 of the domain name server that the endpoints 120, 122, and 124 are co-located with the network element 130 that stores any cached DNS responses.

Figure 2:
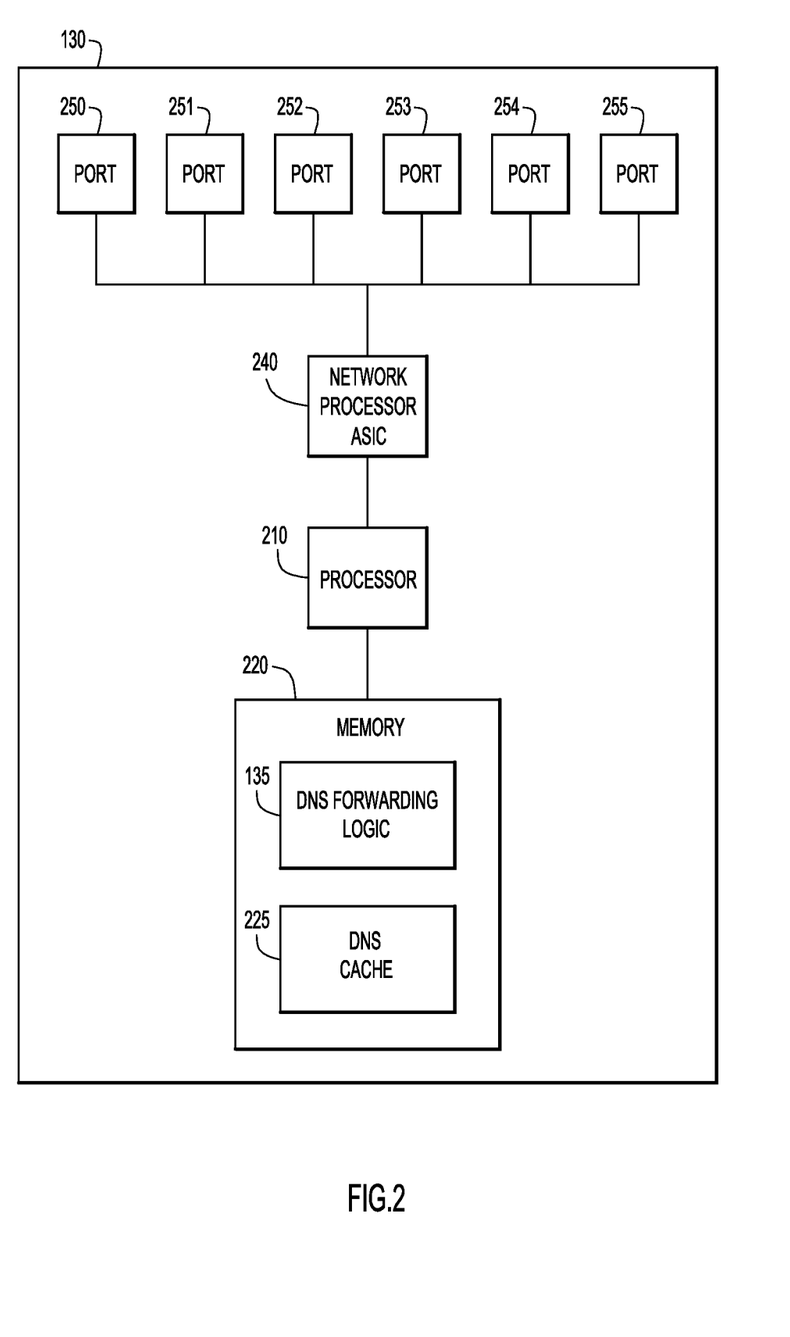
FIG. 2 is a simplified block diagram of a network element that may be configured to perform the methods presented herein, according to an example embodiment.

Referring now to FIG. 2, a simplified block diagram is shown of the network element 130 configured to perform the techniques of a DNS forwarder. Network element 130 includes, among other possible components, a processor 210 to process instructions relevant to processing DNS requests, and memory 220 to store a variety of data and software instructions (e.g., DNS forwarding logic 135, DNS cache 225, communication packets, etc.). The network element 130 also includes a network processor application specific integrated circuit (ASIC) 240 to process communication packets that flow through the network element 130. Network processor ASIC 240 processes communication packets be sent to and received from ports 250, 251, 252, 253, 254, and 255. While only six ports are shown in this example, any number of ports may be included in network element 130.

Memory 220 may include read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (e.g., by the processor 210) it is operable to perform the operations described herein.

It is to be understood that the network element 130 may be a physical device or a virtual (software) device. In the latter case, the network element 130 is embodied as software running on a compute node (e.g., in a datacenter or other environment) through which traffic is directed and for which determinations are made as to how DNS requests are to be handled.

Figure 3:
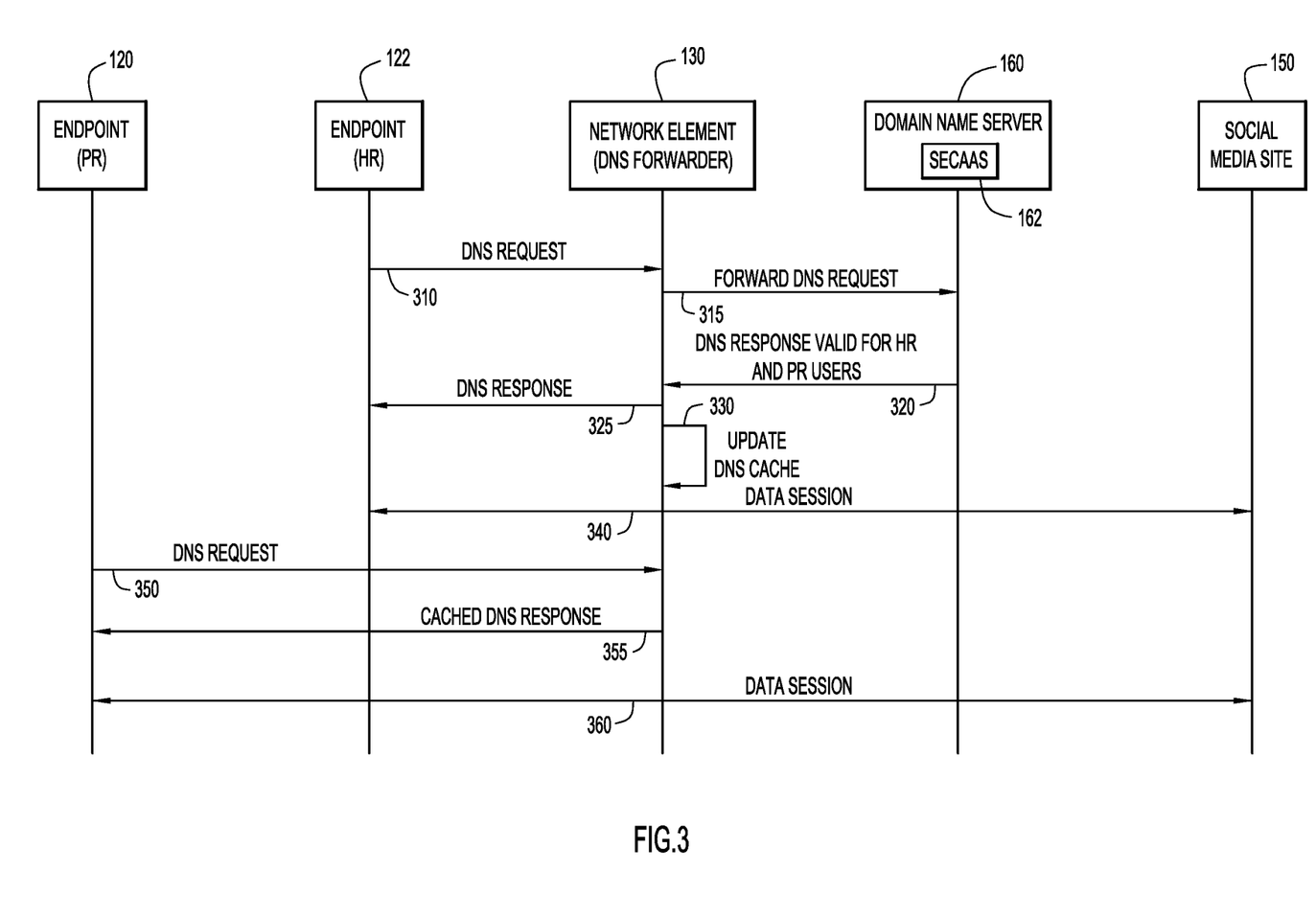
FIG. 3 is a ladder diagram showing messages between devices in the DNS system that are authorized to access an outside content provider in accordance with a method presented herein.

Referring now to FIG. 3, a ladder diagram illustrates the caching of a DNS response for authorized user groups. Initially, an endpoint 122 sends a DNS Request 310 to the network element 130 on the enterprise network. The DNS request 310 includes a domain name for a social media site (e.g., corresponding to public server 150 shown in FIG. 1), which the user of endpoint 122 wishes to access. In one example, the domain name is a Fully Qualified Domain Name (FQDN) that identifies the social media site 150. The DNS request 310 also includes a user identifier associated with the Human Resources (HR) department of the organization, indicating that the endpoint 122 is being used by an HR employee. The network element 130 determines that it does not have cached DNS response that is applicable to both the social media site 150 and the HR user group, and forwards the DNS request 315 to the domain name server 160. In one example, the network element 130 includes the user identifier as an Extension Mechanism for DNS version 0 (EDNS0) option added to the DNS request 315. The EDNS0 option in the DNS request 315 conveys the user group (i.e., HR) of the endpoint 122 to the SecaaS element of the domain name server 160.

In one example, the SecaaS logic 162 in the domain name server 160 is configured with identity-based policies for category based filtering. As an example, social media sites can be accessed by some user groups, but are blocked for other user groups. The domain name server 160 resolves the domain name for the social media site 150 into a network address based on the applicable SecaaS policies for an HR employee of the organization, and sends the DNS response 320 to the network element 130. The SecaaS logic 162 determines that the DNS response 320 is also applicable to users from the Public Relations (PR) department of the organization, and includes the user identifier for the PR department with the DNS response 320. In other words, the DNS response 320 includes the network address for the social media site 150, as well as user identifiers associated with the HR department and the PR department. In one example, the user identifiers are included in an EDNS0 option of the DNS response 320 to indicate which user groups (i.e., HR and PR) should receive the DNS response 320.

After receiving the DNS response 320 from the domain name server 160, the network element 130 sends the DNS response 325 to the endpoint 122. The network element 130 also sends an update 330 to the DNS cache to reflect that the DNS response 320 is applicable only for specific user groups, i.e., HR employees and PR employees. In one example, the DNS cache is located at the network element 130. Alternatively, the DNS cache may be stored at a separate computing device within the enterprise network. The endpoint 122 receives the DNS response 325 with the domain name resolved to the network address of the social media site 150, and can begin to communicate with the social media site 150 in a data session 340.

When the user of the endpoint 120 wants to access the social media site 150, the endpoint 120 sends a DNS request 350 to resolve the domain name. The DNS request 350 includes the domain name of the social media site 150 as well as a user identifier associated with the PR department, since the user is an employee of the PR department. The network element 130 checks to see if the domain name in the DNS request 350 matches an entry in the DNS cache. Since the DNS response 320 has been stored in the DNS cache, there is a cache hit for the domain name of the social media site 150. The network element 130 also determines whether the user identifier in the DNS request 350 is associated with the DNS response stored in the DNS cache. Since the DNS response 320 was indicated as being associated with the PR user group, in addition to the HR user group, the network element 130 determines that the endpoint 120 is authorized to receive the cached DNS response, and sends the cached DNS response 355 to the endpoint 120. With the network address in the cached DNS response 355, the endpoint 120 can begin to communicate with social media site 150 in a data session 360.

Figure 4:
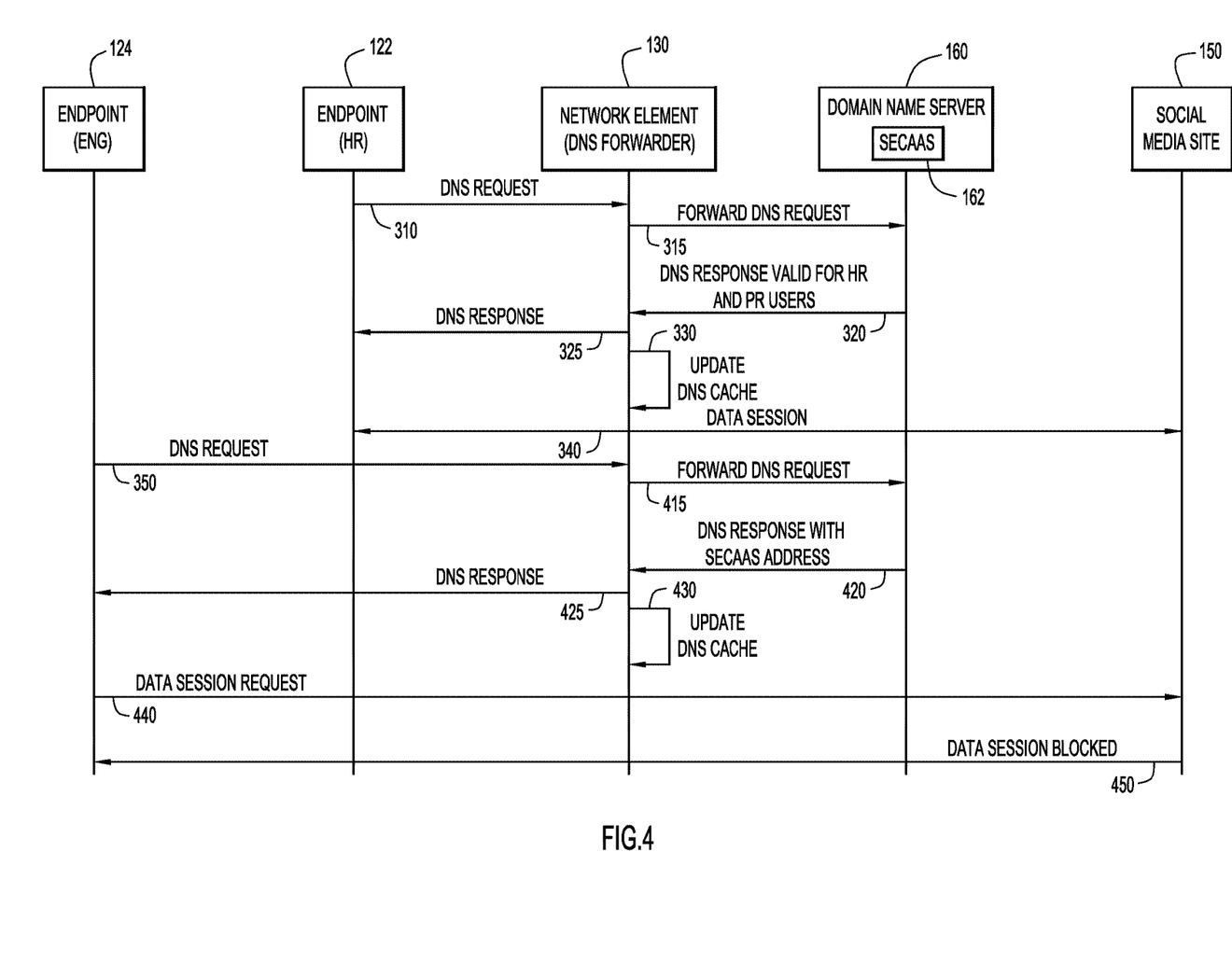
FIG. 4 is a ladder diagram showing messages between devices that may not be authorized to access an outside content provider, according to an example embodiment.

Referring now to FIG. 4, a ladder diagram illustrates the caching of a DNS response for authorized user groups, and blocking unauthorized user groups. The initial messages in FIG. 4 duplicate the initial messages described in FIG. 3, with the endpoint 122 of an HR employee sending the DNS request 310 for the network address of the social media site 150. The domain name server 160 responds with the DNS response 320 that is valid for HR employees and PR employees. The DNS response 320 is entered into the DNS cache in association with the user groups of the HR department and PR department. With the properly resolved domain name, the endpoint 122 is able to participate in the data session 340 with the social media site 150.

The endpoint 124 sends a DNS request 140 when the user of the endpoint 124 wants to access the social media site 150. The user of the endpoint 124 is an employee in the engineering (ENG) department, and the network element 130 sends the DNS request 415 including a user identifier associated with the engineering user group. The SecaaS logic 162 in the domain name server 160 determines that the access policy does not allow users from the engineering group to access social networking sites, and returns a DNS response 420 with the network address of the SecaaS logic 162, e.g., the domain name server 160. The DNS response 420 also includes the user identifier associated with the engineering group so that the network element 130 can associate the network address in the DNS response 420 with the engineering group user identifier. The network element 130 sends the DNS response 425, which resolves the domain name of the social media site 150 to the network address of the SecaaS logic 162 at the domain name server 160, to the endpoint 124. The network element 130 may also cache the DNS response 420 in an update 430 to the DNS cache.

The endpoint 124 sends a request 440 for a data session with social media site 150, but the request 440 is sent to the SecaaS logic 162 in the domain name server 160 since the DNS response 425 associates the domain name of the social media site 150 with the network address of the domain name server 160. On receiving the data session request 440, the SecaaS logic 162 responds with a message 450 indicating that the data session is blocked for users in the engineering group.

In one example, the SecaaS logic 162 maintains one or more user identity policies, each of which specifies which domain names a particular user identity may access. For instance, one user identity policy may specify that users in the "Owner" user group are allowed to access any domain names. Another user identity policy may specify that users in the "Employee" user group are allowed to access reputable news domains and corporate domains, but are blocked from social networking domains. The user identity policies may include policies based on categories of domain names (e.g., adware, blog, corporate, games, news, social networking, etc.) and/or based on individual domain name (e.g., contact.corporationXYZ.com, twitterbook.com, etc.).

If a user identity policy is changed at the SecaaS logic 162, then the domain name server 160 will send a notification to the network element 130. The network element 130 may purge the DNS cache completely to prevent stale entries of cached DNS responses that are no longer valid for a particular user group. Alternatively, the SecaaS logic 162 may notify the network element 130 of the specific user identity policy that has changed, and the network element 130 will only purge entries that associated with that specific user identity. In another example, the network element 130 may remove the association between the cached DNS responses and the specific user identity that has changed, but maintain the cached DNS response if any other user identities remain associated with the cached DNS response, while purging cached DNS responses that were only associated with the changed user identity policy.

In a further example, the SecaaS logic 162 may use a domain security policy that classifies domain names according to a reputation score. The domain security policy may be used as a policy in determining whether to accurately resolve a particular domain name to the network address of the domain name. For instance, a domain security policy may specify that domain names with a reputation score below a predetermined threshold are to be blocked for all user groups. Another domain security policy may allow domain names with a reputation score below another threshold to be accessed by some user groups (e.g., Information Technology (IT) employees), but remain blocked for other user groups. If a reputation score associated with a particular domain name changes, then the SecaaS logic 162 sends a notification to the network element 130. The network element 130 purges the DNS cache of any entries associated with the particular domain name. This forces any new DNS requests for the particular domain name to be routed through the SecaaS logic 162 and subjected to any change in access policy based on the updated reputation score.

Figure 5:
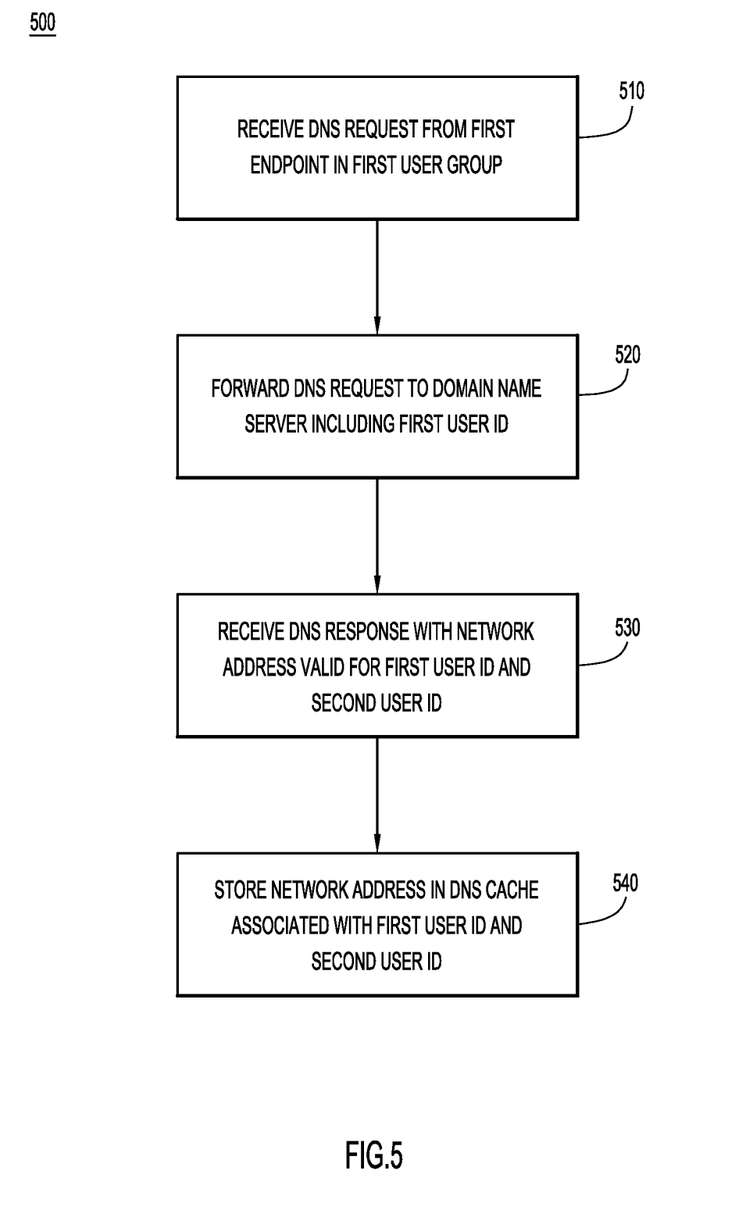
FIG. 5 is a flowchart illustrating operations of a network element in caching DNS responses, according to an example embodiment.

Referring now to FIG. 5, a flowchart illustrates operations performed by a network element in a process 500 to cache DNS responses in association with user identities. In step 510, the network element receives a first DNS request from a first endpoint. In one example, the first DNS request includes a domain name to resolve and a first user identifier associated with the first endpoint device. Alternatively, the network element may determine the first user identifier associated with the first endpoint device based on properties (e.g., the source network address) of the first DNS request. In step 520, the network element forwards the first DNS request along with the first user identifier to a domain name server, which is configured SecaaS logic to control network access based on the user identities.

In step 530, the network element receives a first DNS response from the domain name server. In one example, the first DNS response includes a network address associated with the domain name, as well as the first user identifier and at least one second user identifier. The second user identifier is associated with a second user group that is also authorized to receive the first DNS response. In step 540, the network element stores the network address from the first DNS response in a DNS cache as a cached DNS response for the domain name. The cached DNS response is associated in the DNS cache with the first user identifier and the second user identifier.

In one example, the network element and the domain name server use a secure communication means for the DNS requests and responses. For instance, the DNS messages may be communicated by DNS over Datagram Transport Layer Security (DTLS) or DNS over Transport Layer Security (TLS). Securely communicating the DNS messages hinders a man-in-the-middle device from modifying the DNS responses or learning any identity information conveyed in the DNS requests/responses.

In another example, the network element and the domain name server may use a secure out-of-band communication channel to exchange information, e.g., through a DNS connector implemented at the network element. This communication channel may also be used to exchange a unique identifier for a list of user group names. In this way, the SecaaS logic in the domain name server does not have to convey the full list of user group names in the DNS responses, and can provide only the unique identifier. Consolidating the full list of user group names into a unique identifier avoids fragmentation of DNS responses that may arise from a lightweight transport layer protocol, such as User Datagram Protocol (UDP). The network element may use either active authentication or passive authentication to learn the endpoint user group details.

Figure 6:
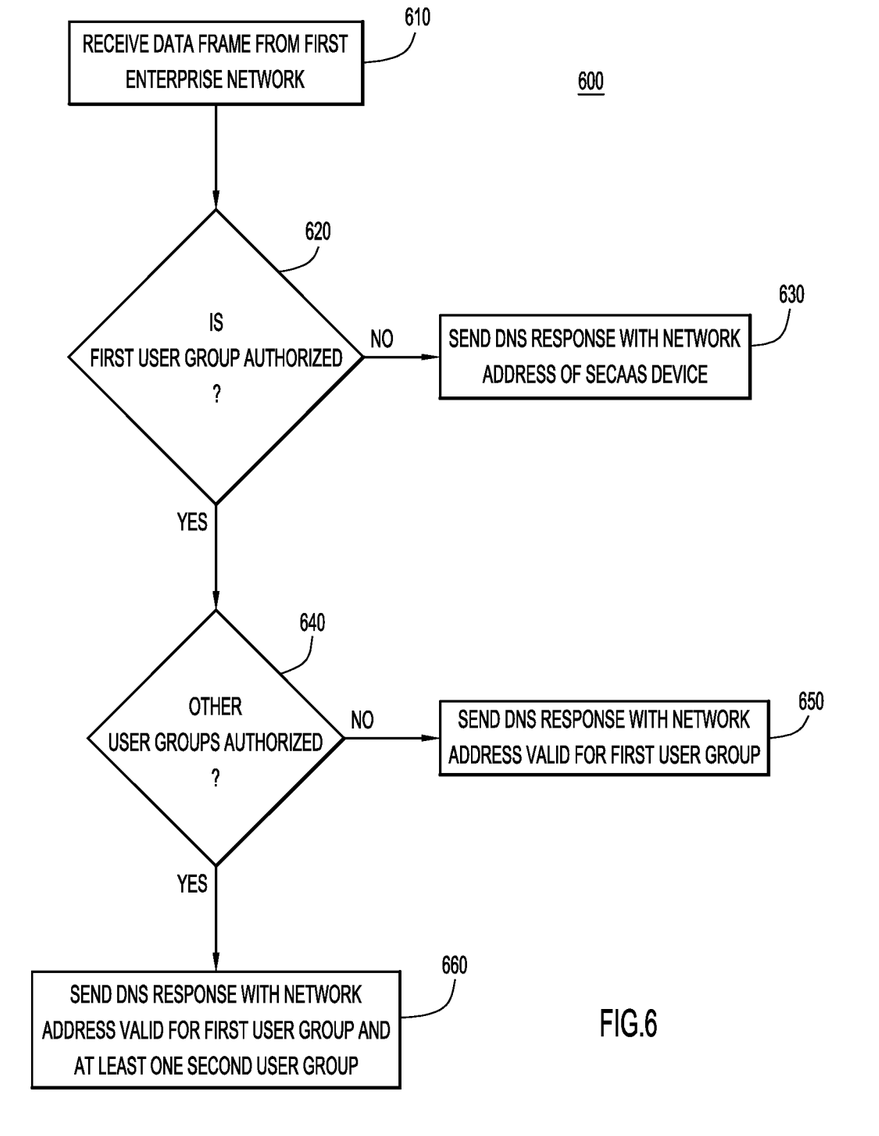
FIG. 6 is a flowchart illustrating operations of a domain name server in providing DNS responses, according to an example embodiment.

Referring now to FIG. 6, a flowchart illustrates operations performed by SecaaS logic at a domain name server in a process 600 to provide DNS-based access control with user identities. In step 610, the SecaaS logic receives a first DNS request from a network element. The first DNS request includes a domain name to resolve and a first user identifier associated with a first user group. If the first user group is not authorized to access the domain name, as determined in step 620, then the SecaaS logic instructs the domain name server to send a DNS response with the network address of the SecaaS logic (e.g., the network address of the domain name server) in step 630.

If the first group is authorized to access the domain name, then the SecaaS logic, in step 640, determines whether any other user groups are authorized to access the domain name. If only the first user group is authorized to access the domain name, then, in step 650, the domain name server sends a DNS response with the accurate network address for the domain name along with the first user identifier, indicating that the DNS response is valid for the first user group. If additional user groups are authorized to access the domain name, then the domain name server send a first DNS response to the network element in step 660, including the accurately resolved network address for the domain name, as well as the first user identifier and at least one second user identifier.

In summary, the techniques presented herein provide for the ability to transport identity policies in DNS responses and cache the DNS responses in association with the identity policies. A DNS forwarder maintaining a DNS cache may use this information to make identity-based policy decisions when responding to DNS requests from endpoints. This allows a DNS caching service on an enterprise network to provide identity-based DNS responses. The techniques presented herein also provide for a mechanism to keep the local DNS cache synchronized with policy changes at the remote SecaaS.

In one form, a method is provided for caching DNS responses in association with user identities. The method comprises, at a first network element, receiving a first DNS request from a first endpoint device. The first DNS request includes a domain name to resolve. The network element forwards the first DNS request to a domain name server along with a first user identifier associated with the first endpoint device. The network element receives a first DNS response from the domain name server. The first DNS response includes a network address associated with the domain name, as well as the first user identifier and at least one second user identifier. The network element stores the network address in a DNS cache as a cached DNS response for the domain name. The cached DNS response is stored in association with the first user identifier and the second user identifier.

In another form, an apparatus is provided comprising a plurality of ports, a memory, and a processor. The ports are configured to send and receive network communications with computing devices over a computer network. The memory includes a memory space configured to serve as a DNS cache. The processor is configured to receive, via a first port among the plurality of ports, a first DNS request from a first endpoint device. The first DNS request includes a domain name to resolve. The processor is also configured to forward the first DNS request along with a first user identifier associated with the first endpoint device to a domain name server via a second port among the plurality of ports. The processor is further configured to receive via the second port, a first DNS response from the domain name server. The first DNS response includes a network address associated with the domain name, as well as the first user identifier and a second user identifier. The processor is configured to store the network address in the DNS cache as a cached DNS response for the domain name. The cached DNS response is stored in association with the first user identifier and the second user identifier.

In yet another form, a method is provided for providing DNS-based access control with user identity policies at a domain name server. The method comprises receiving a first DNS request from a network element. The first DNS request includes a domain name to resolve and a first user identifier associated with a first user group. The method further comprises determining whether the first user group is authorized to access the domain name. The domain name server sends a first DNS response to the network element for storage in a DNS cache on the network element. The first DNS response includes a network address associated with the domain name, as well as the first user identifier and at least one second user identifier.

In still another form, a non-transitory computer readable storage media is provided that is encoded with instructions that, when executed by a processor, cause the processor to perform any of the methods described and shown herein.

The above description is intended by way of example only.

What is claimed is:

1. A method comprising:
   at a network element, receiving a first Domain Name System (DNS) request from a first endpoint device, the first DNS request including a domain name to resolve;
   forwarding the first DNS request to a domain name server along with a first user identifier corresponding to the first endpoint device;
   receiving a first DNS response from the domain name server, the first DNS response including a network address corresponding to the domain name, a first indication that the first DNS response is applicable for a first set of endpoints corresponding to the first user identifier, and a second indication that the first DNS response is also applicable for a second set of endpoints corresponding to a second user identifier that is distinct from the first user identifier, wherein the first user identifier corresponds to a first user group and the second user identifier corresponds to a second user group;

storing the network address in a DNS cache as a cached DNS response for the domain name, the cached DNS response corresponding to the first user identifier and the at least one second user identifier;

sending the cached DNS response to a second endpoint among the second set of endpoints, wherein the cached DNS response corresponds to the second user identifier based on the second indication from the domain name server; and determining that the second user group is authorized to access the domain name, wherein determining that the second user group is authorized to access the domain name is based on a user identity policy and a domain security policy, the user identity policy identifying which domain names a particular user group is authorized to access, and the domain security policy identifying reputation scores corresponding to domain names.

2. The method of claim 1, further comprising sending the cached DNS response to the first endpoint device.

3. The method of claim 1, wherein sending the cached DNS response to the second endpoint comprises:
receiving a second DNS request from the second endpoint device, the second DNS request including the domain name and the second user identifier;
retrieving the cached DNS response for the domain name corresponding to the second user identifier; and
sending the cached DNS response to the second endpoint device.

4. The method of claim 1, further comprising:
receiving an additional DNS request including the domain name and a third user identifier;
responsive to a determination that the DNS cache does not include an entry for the domain name corresponding to the third user identifier, forwarding the additional DNS request to the domain name server;
receiving an additional DNS response from the domain name server, the additional DNS response including an additional network address corresponding to the domain name and the third user identifier; and
storing the additional network address in the DNS cache as an additional cached DNS response for the domain name, the additional cached DNS response corresponding to the third user identifier.

5. The method of claim 1, further comprising:
receiving from the domain name server an indication that a user identity policy has changed; and
purging the DNS cache completely in response to the indication that the user identity has changed.

6. The method of claim 1, further comprising:
receiving from the domain name server an indication that a security policy for a specific domain name has changed; and
purging any entries in the DNS cache related to the specific domain name.

7. An apparatus comprising:
a plurality of ports configured to send and receive network communications with computing devices over a computer network;
a memory including memory space configured to serve as a Domain Name System (DNS) cache; and
a processor configured to:
receive, via a first port among the plurality of ports, a first DNS request from a first endpoint device, the first DNS request including a domain name to resolve;
forward the first DNS request along with a first user identifier corresponding to the first endpoint device to a domain name server via a second port among the plurality of ports;
receive, via the second port, a first DNS response from the domain name server, the first DNS response including a network address corresponding to the domain name, a first indication that the first DNS response is applicable for a first set of endpoints corresponding to the first user identifier, and a second indication that the first DNS response is also applicable for a second set of endpoints corresponding to a second user identifier that is distinct from the first user identifier, wherein the first user identifier corresponds to a first user group and the second user identifier corresponds to a second user group;
store the network address in the DNS cache as a cached DNS response for the domain name, the cached DNS response corresponding to the first user identifier and the second user identifier;
send the cached DNS response to a second endpoint among the second set of endpoints, wherein the cached DNS response corresponds to the second user identifier based on the second indication from the domain name server; and
determine that the second user group is authorized to access the domain name, wherein determining that the second user group is authorized to access the domain name is based on a user identity policy and a domain security policy, the user identity policy identifying which domain names a particular user group is authorized to access, and the domain security policy identifying reputation scores corresponding to domain names.

8. The apparatus of claim 7, wherein the processor is further configured to send the cached DNS response to the first endpoint device via the first port.

9. The apparatus of claim 7, wherein the processor is further configured to send the cached DNS response by:
receiving a second DNS request from the second endpoint device, the second DNS request including the domain name and the second user identifier;
retrieving the cached DNS response for the domain name corresponding to the second user identifier; and
sending the cached DNS response to the second endpoint device.

10. The apparatus of claim 7, wherein the processor is further configured to:
receive an additional DNS request including the domain name and a third user identifier;
responsive to a determination that the DNS cache does not include an entry for the domain name corresponding to the third user identifier, forward the additional DNS request to the domain name server;
receive an additional DNS response from the domain name server, the additional DNS response including an additional network address corresponding to the domain name and the third user identifier; and
store the additional network address in the DNS cache as an additional cached DNS response for the domain name, the additional cached DNS response corresponding to the third user identifier.

11. The apparatus of claim 7, wherein the processor is further configured to:
- receive, via the second port, an indication that a user identity policy has changed; and
- purge the DNS cache completely in response to the indication that the user identity has changed.

12. The apparatus of claim 7, wherein the processor is further configured to:
- receive, via the second port, an indication that a security policy for a specific domain name has changed; and
- purge any entries in the DNS cache related to the specific domain name.

13. A method comprising:
- at a domain name server, receiving a first Domain Name System (DNS) request from a network element, the first DNS request including a domain name to resolve and a first user identifier corresponding to a first user group;
- determining whether the first user group is authorized to access the domain name, wherein determining whether the first user group is authorized to access the domain name is based on a user identity policy and a domain security policy, the user identity policy identifying which domain names a particular user group is authorized to access, and the domain security policy identifying reputation scores corresponding to domain names;
- determining that a second user group corresponding to a second user identifier is authorized to access the domain name based on the user identity policy and the domain security policy; and
- sending a first DNS response to the network element for storage in a DNS cache on the network element, the first DNS response including a network address corresponding to the domain name, a first indication that the first DNS response is applicable for the first user group corresponding to the first user identifier, and a second indication that the first DNS response is applicable for the second user group corresponding to the second user identifier, wherein storing the first DNS response in the DNS cache as a cached DNS response enables the network element to send the cached DNS response to a second endpoint corresponding to the second user identifier.

14. The method of claim 13, further comprising, responsive to a determination that the user identity policy has changed, instructing the network element to purge all entries in the DNS cache.

15. The method of claim 13, further comprising, responsive to a determination that the domain security policy has changed for a particular domain name, instructing the network element to purge the DNS cache of any entries related to the particular domain name.

16. The method of claim 13, wherein the network address included in the first DNS response corresponds to a security service in response to a determination that the first user group is not authorized to access the domain name.

17. The method of claim 13, wherein the network address included in the first DNS response corresponds to a computing device associated with the domain name in response to a determination that the first user group is authorized to access the domain name.

* * * * *